United States Patent [19]
Padovani et al.

[11] Patent Number: 6,151,502
[45] Date of Patent: *Nov. 21, 2000

[54] METHOD AND APPARATUS FOR PERFORMING SOFT HAND-OFF IN A WIRELESS COMMUNICATION SYSTEM

[75] Inventors: Roberto Padovani; Roy F. Quick, both of San Diego, Calif.

[73] Assignee: Qualcomm Incorporated, San Diego, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/790,497

[22] Filed: Jan. 29, 1997

[51] Int. Cl.$^7$ ........................................ H04Q 7/20
[52] U.S. Cl. .................. 455/442; 455/436; 455/525; 370/331; 370/332
[58] Field of Search .................... 455/436, 437, 455/524, 525, 438–444; 370/331, 332

[56] References Cited

U.S. PATENT DOCUMENTS

| | | | |
|---|---|---|---|
| 4,112,257 | 9/1978 | Frost | 179/2 EB |
| 4,123,718 | 10/1978 | Lampert et al. | 325/474 |
| 4,765,753 | 8/1988 | Schmidt | 379/60 |
| 4,777,653 | 10/1988 | Bonnerot et al. | 455/69 |
| 4,811,421 | 3/1989 | Havel et al. | 455/69 |
| 4,868,795 | 9/1989 | McDavid et al. | 367/77 |
| 4,870,698 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,093,840 | 3/1992 | Schilling | 375/1 |
| 5,101,501 | 3/1992 | Gilhousen et al. | 455/33 |
| 5,103,459 | 4/1992 | Gilhousen et al. | 375/1 |
| 5,107,487 | 4/1992 | Vilmur et al. | 370/18 |
| 5,128,965 | 7/1992 | Henriksson | 375/58 |
| 5,204,876 | 4/1993 | Bruckert et al. | 375/1 |
| 5,220,678 | 6/1993 | Feei | 455/69 |
| 5,245,629 | 9/1993 | Hall | 375/1 |
| 5,257,293 | 10/1993 | Gilhousen et al. | 370/1 |
| 5,265,119 | 11/1993 | Gilhousen et al. | 375/1 |
| 5,267,261 | 11/1993 | Blakeney, II et al. | 455/437 |
| 5,267,262 | 11/1993 | Wheatley, III et al. | 375/1 |
| 5,285,447 | 2/1994 | Hulsebosch | 455/437 |
| 5,305,468 | 4/1994 | Bruckert et al. | 455/69 |
| 5,383,219 | 1/1995 | Wheatley, III et al. | 375/1 |
| 5,390,338 | 2/1995 | Bodin et al. | 455/33.1 |
| 5,422,933 | 6/1995 | Barnett et al. | 379/60 |
| 5,450,616 | 9/1995 | Rom | 455/69 |
| 5,465,399 | 11/1995 | Oberholtzer et al. | 455/69 |
| 5,487,180 | 1/1996 | Ohtake | 455/54.1 |
| 5,539,744 | 7/1996 | Chu et al. | 455/436 |
| 5,577,022 | 11/1996 | Padovani et al. | 370/13 |
| 5,697,053 | 12/1997 | Hanly | 455/522 |
| 5,701,585 | 12/1997 | Kallin et al. | 455/437 |
| 5,752,190 | 5/1998 | Kaewell, Jr. et al. | 455/436 |
| 5,774,809 | 6/1998 | Tuutijarvi et al. | 455/437 |
| 5,889,768 | 3/1999 | Storm et al. | 370/320 |

FOREIGN PATENT DOCUMENTS

| | | | |
|---|---|---|---|
| 615355 A2 | 9/1994 | European Pat. Off. | H04B 7/26 |
| 2757734 | 6/1998 | France . | |
| 9406218 | 3/1994 | WIPO | H04Q 7/04 |
| 9512297 | 5/1995 | WIPO . | |

*Primary Examiner*—Reinhard J. Eisenzopf
*Assistant Examiner*—Duc Nguyen
*Attorney, Agent, or Firm*—Philip R. Wadsworth; Sean English; Kyong H. Macek

[57] ABSTRACT

A method and apparatus for providing soft handoff in a mobile communication system. In current systems is that the members of active set are determined in accordance with comparisons of measured pilot energy with fixed thresholds. However, the value of providing a redundant communication link to a mobile station depends strongly on the energy of other signals being provided to the mobile station. In the present invention, the signal strengths of other base stations in communication with a mobile station are considered when determining whether adding a base to that set of base stations in communication with the remote station is of sufficient value to justify the impact on system capacity.

11 Claims, 8 Drawing Sheets

METHOD AND APPARATUS FOR PERFORMING SOFT HAND-OFF IN A WIRELESS COMMUNICATION SYSTEM

BACKGROUND OF THE INVENTION

I. Field of the Invention

The present invention relates to communication systems. More particularly, the present invention relates to a novel and improved method and system for performing hand-off in a wireless communication system.

II. Description of the Related Art

The use of code division multiple access (CDMA) modulation techniques is but one of several techniques for facilitating communications in which a large number of system users are present. Although other techniques, such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS" and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and are incorporated by reference. The method for providing CDMA mobile communications was standardized by the Telecommunications Industry Association in TIA/EIA/IS-95-A entitled "Mobile Station-Base Station Compatibility Standard for Dual-Mode Wideband Spread Spectrum Cellular System".

In the just mentioned patents, a multiple access technique is disclosed in which a large number of mobile telephone users, each having a transceiver, communicate through satellite repeaters or terrestrial base stations (also known as cell base stations or cell-sites) using code division multiple access (CDMA) spread spectrum communication signals. In using CDMA communications, the frequency spectrum can be reused multiple times thus permitting an increase in system user capacity. The use of CDMA techniques results in much higher spectral efficiency than can be achieved using other multiple access techniques.

A method for simultaneously demodulating data that has traveled along different propagation paths from one base station and for simultaneously demodulating data redundantly provided from more than one base station is disclosed in U.S. Pat. No. 5,109,390 (the '390 patent), entitled "DIVERSITY RECEIVER IN A CDMA CELLULAR COMMUNICATION SYSTEM", assigned to the assignee of the present invention and incorporated by reference herein. In the '390 patent, the separately demodulated signals are combined to provide an estimate of the transmitted data which has higher reliability than the data demodulated by any one path or from any one base station.

Handoffs can generally be divided into two categories—hard handoffs and soft handoffs. In a hard handoff, when a mobile station leaves an origination cell and enters a destination cell, the mobile station breaks its communication link with the origination cell and thereafter establishes a new communication link with the destination cell. In soft handoff, the mobile station completes a communication link with the destination cell prior to breaking its communication link with the origination cell. Thus, in soft handoff, the mobile station is redundantly in communication with both the origination cell and the destination cell for some period of time.

Soft handoffs are far less likely to drop calls than hard handoffs. In addition, when a mobile station travels near a cell boundary, it may make repeated handoff requests in response to small changes in the environment. This problem, referred to as ping-ponging, is also greatly lessened by soft handoff. The process for performing soft handoff is described in detail in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM" assigned to the assignee of the present invention and incorporated by reference herein.

An improved soft handoff technique is disclosed in U.S. Pat. No. 5,267,261, entitled "MOBILE STATION ASSISTED SOFT HANDOFF IN A CDMA CELLULAR COMMUNICATIONS SYSTEM", which is assigned to the assignee of the present invention and incorporated by reference herein. In the system of the '261 patent, the soft handoff process is improved by measuring the strength of "pilot" signals transmitted by each base station within the system at the mobile station. These pilot strength measurements are of assistance in the soft handoff process by facilitating identification of viable base station handoff candidates.

The viable base station candidates can be divided into four sets. The first set, referred to as the active set, comprises base stations which are currently in communication with the mobile station. The second set, referred to as the candidate set, comprises base stations which have been determined to be of sufficient strength to be of use to the mobile station. Base stations are added to the candidate set when their measured pilot energy exceeds a predetermined threshold $T_{ADD}$. The third set is the set of neignbor set base stations which are in the vicinity of the mobile station (and which are not included in the Active Set or the Candidate Set). And the fourth set is the Remaining Set which consists of all other base stations.

In an IS-95-A communication system, the mobile station sends a Pilot Strength Measurement Message when it finds a pilot of sufficient strength that is not associated with any of the Forward Traffic Channels currently being demodulated or when the strength of a pilot that signal is associated with one of the Forward Traffic Channels being demodulated drops below a threshold for a predetermined period of time. The mobile station sends a Pilot Strength Measurement Message following the detection of a change in the strength of a pilot under the following three conditions:

1. The strength of a neighbor set or Remaining Set pilot is found above the threshold $T_{ADD}$.
2. The strength of a candidate set pilot exceeds the strength of an active set pilot by more that a threshold ($T_{COMP}$).
3. The strength of a pilot in the active set of Candidate Set has fallen below a threshold ($T_{DROP}$) for greater than a predetermined time period.

The Pilot Strength Measurement Message identifies the base station and the measured pilot energy in decibels.

A negative aspect of soft handoff is that because it involves redundantly transmitting information it consumes the available communication resource. However, soft handoff can provide great improvement in the quality of communication. Therefore, there is a need felt in the art for a method of minimizing the number of base stations transmitting redundant data to a mobile station user which provides sufficient transmission quality.

SUMMARY OF THE INVENTION

The present invention is a novel and improved method and apparatus for providing soft handoff in a mobile communication system. It should be noted at the outset, that one of the biggest problems with current systems is that the members of active set are determined in accordance with comparisons of measured pilot energy with fixed thresholds. However, the value of providing a redundant communication link to a mobile station depends strongly on the energy of other signals being provided to the mobile station. For example, the value of redundantly transmitting to a mobile station a signal with received energy of −15 dB will not be of much value, if the mobile station is already receiving a transmission with signal energy of −5 dB. However, redundantly transmitting to a mobile station a signal of received energy of −15 dB may be of substantial value, if the mobile station is receiving transmissions with signal energy of only −13 dB.

In a first embodiment of the present invention, the mobile station under the conditions discussed above transmits a Pilot Strength Measurement Message, which identifies each base station in the active and candidate sets and their corresponding measured pilot energy. The Pilot Strength Measurement Message is received by the base stations in communication with the mobile station. The base stations provide this information to a central control center, referred to as the base station controller.

At the base station controller, the active set is determined in accordance with the combined strength of other pilots in the active set. The base station controller sorts the pilot signal of the Pilot Strength Measurement Message according to their pilot strength measured at the mobile station. Thus, after sorting the list of base stations consists of $P_1, P_2 \ldots P_N$, where $P_1$ is the strongest pilot signal and $P_N$ is the weakest. An iterative process is then undertaken to determine which of pilots $P_1, P_2 \ldots P_N$ should be part of the revised active set.

Initially, the revised active set comprises only the strongest pilots $P_1$ and $P_2$. When determining whether a pilot $P_i$ should be made part of the active set, a COMBINED_PILOT value is computed. The COMBINED_PILOT value consists of the sum of the energies of the pilots currently in the revised active set ($P_1, P_2 \ldots P_{i-1}$). A threshold is then generated in accordance with the COMBINED_PILOT. In the exemplary, embodiment the threshold is generated by performing a linear operation on the value of COMBINED_PILOT. If the pilot energy value, $P_i$, exceeds the threshold, it is added to the revised active set and the process is repeated for the next pilot $P_{i+1}$. If the pilot energy value, $P_i$, does not exceed the threshold, the revised active set comprises $P_1, P_2 \ldots P_{i-1}$. The revised active set is transmitted to the mobile station and the base station controller then sets up communications with the mobile station in accordance with the revised active set.

In an alternative embodiment, the revised active set is generated in the mobile station. The mobile station continuously measures received pilot strengths of base stations. In determining whether to send a message indicating that a pilot signal from the candidate set should be moved to the active set, the measured pilot energy of a pilot in the candidate set is compared against a threshold generated in accordance with the COMBINED_PILOT as described above. If the strongest pilot signal in the candidate set satisfies the rule, then a message containing all active and candidate set pilots will be sent.

Following the iterative process performed on the members of the candidate set, a second iterative process is performed to determine whether a pilot should be deleted from the revised active set. In this operation, pilots are tested from the weakest member of revised active set to the strongest. A COMBINED_PILOT energy value is computed that is the sum of the energies of all pilots belonging to the active set. A threshold value is generated in accordance with the COMBINED_PILOT value as described above and the pilot signal being tested is compared with the threshold. If a pilot signal strength has been below the threshold value for a predetermined period of time, a message would be sent to the base station indicating that such a pilot signal should be dropped.

The revised active list is transmitted to the base station controller through the base stations with which the mobile station is in communication. The base station sets up the communication links with the base stations in the mobile generated revised active list and transmits an acknowledgment to the mobile station when the links are set up. The mobile station then conducts communications through the base stations of the revised active set.

In the preferred embodiment, the mobile station monitors the pilot signals and in response to the monitored pilot signals the mobile station compiles members of the candidate set. Moreover, the mobile station determines whether a change to the current active set is desirable in view of the criteria discussed above. Upon detecting any change in the desired membership of the active set, the mobile station generates a pilot strength measurement message that, as described above, includes the identities of all pilots in the candidate and active sets and corresponding measured energy values and a corresponding indication whether the pilot should remain in the sets or be dropped into the neighbor set (which is indicated by setting of the KEEP variable described earlier). In the exemplary embodiment, the base station determines the members of the revised active set in accordance with the method described with respect to FIG. 5.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
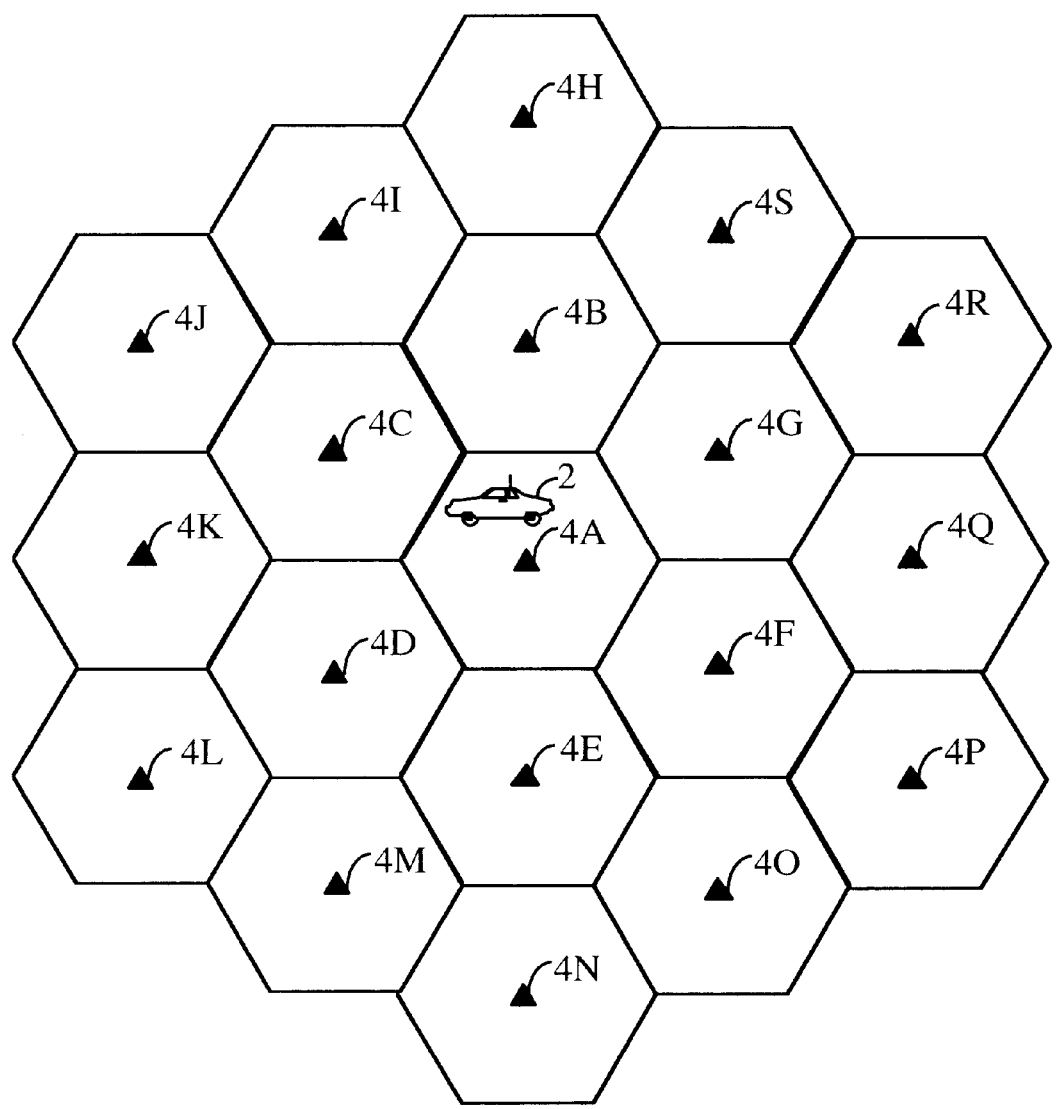
FIG. 1 is an illustration of a cellular communication network.

FIG. 1 illustrates a wireless communication network in which the geographical area has been divided up into coverage areas referred to as cells and illustrated by a set of adjacent hexagons. Each cell is served by a corresponding base station 4. Each base station transmits a pilot signal which uniquely identifies that base station. In the exemplary embodiment, the base stations 4 are CDMA base stations. A detail description of soft handoff in a wireless CDMA communication system is described in detail in the aforementioned U.S. Pat. Nos. 5,101,501 and 5,267,261.

Mobile station 2 is located within the cell served by base station 4A. Since mobile station 2 is located near the cell boundary, it will likely be in a soft hand-off condition, in which it is simultaneously in communication with more than one base station. It may, for example, be in communication with base stations 4A and 4B. Thus, base stations 4A and 4B are said to make up the active set. Moreover, it may be that mobile station 2 has determined that other base stations in its vicinity have a measured pilot energy above a predetermined threshold TADD, but that those base stations are not currently in communication with the mobile station. The pilot signals of those base stations are said to make up the candidate set. The candidate set could be made up of base stations 4C and 4G.

Figure 2:
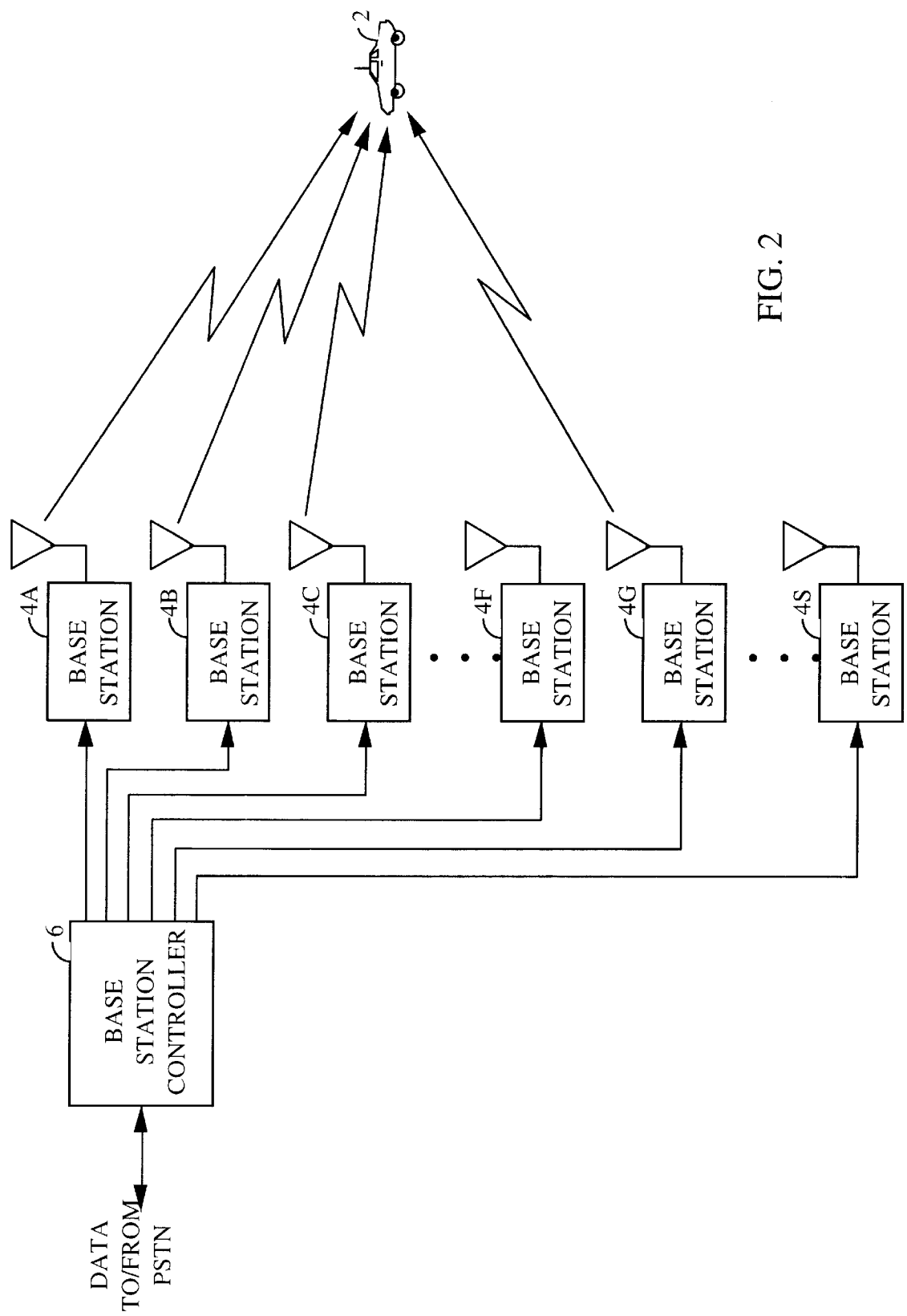
FIG. 2 is an illustration of the cellular communication network of FIG. which includes the base station controller.

Referring to FIG. 2, a typical communication network is illustrated. data directed mobile station 2 is provided from a public switched telephone network or other wireless system (not shown) to base station controller 6. Base station controller 6 provides the data to the base stations in mobile station 2's active list. In the example, base station controller 6 redundantly provides data to and receives data from base stations 4A and 4B. The present invention is equally applicable to conditions where each cell is divided into sectors. Communications to and from each sector can be separately received and demodulated by mobile station 2. For simplicity, the discussion will be described wherein in each base of base station 4 are uniquely located base stations. However, it will be readily seen by one skilled in the art that the present invention is equally applicable to sectored cells, simply by considering the possibility that the base stations can be co-located and transmitting to separate sectors within a cell. The condition where a mobile station is in simultaneous communication with more than one sector of a cell is referred to as softer handoff. The method and apparatus for performing softer hand-off are described in detail in copending U.S. patent application Ser. No. 08/144,903, entitled "METHOD AND APPARATUS FOR PERFORMING HANDOFF BETWEEN SECTORS OF A COMMON BASE STATION", filed Oct. 30, 1993, which is assigned to the assignee of the present invention and incorporated by reference herein.

Within mobile station 2, each copy of the data packet is separately received, demodulated and decoded. The decoded data is then combined to give an estimate of the data of greater reliability than any one of demodulated estimates of the data.

Figure 3:
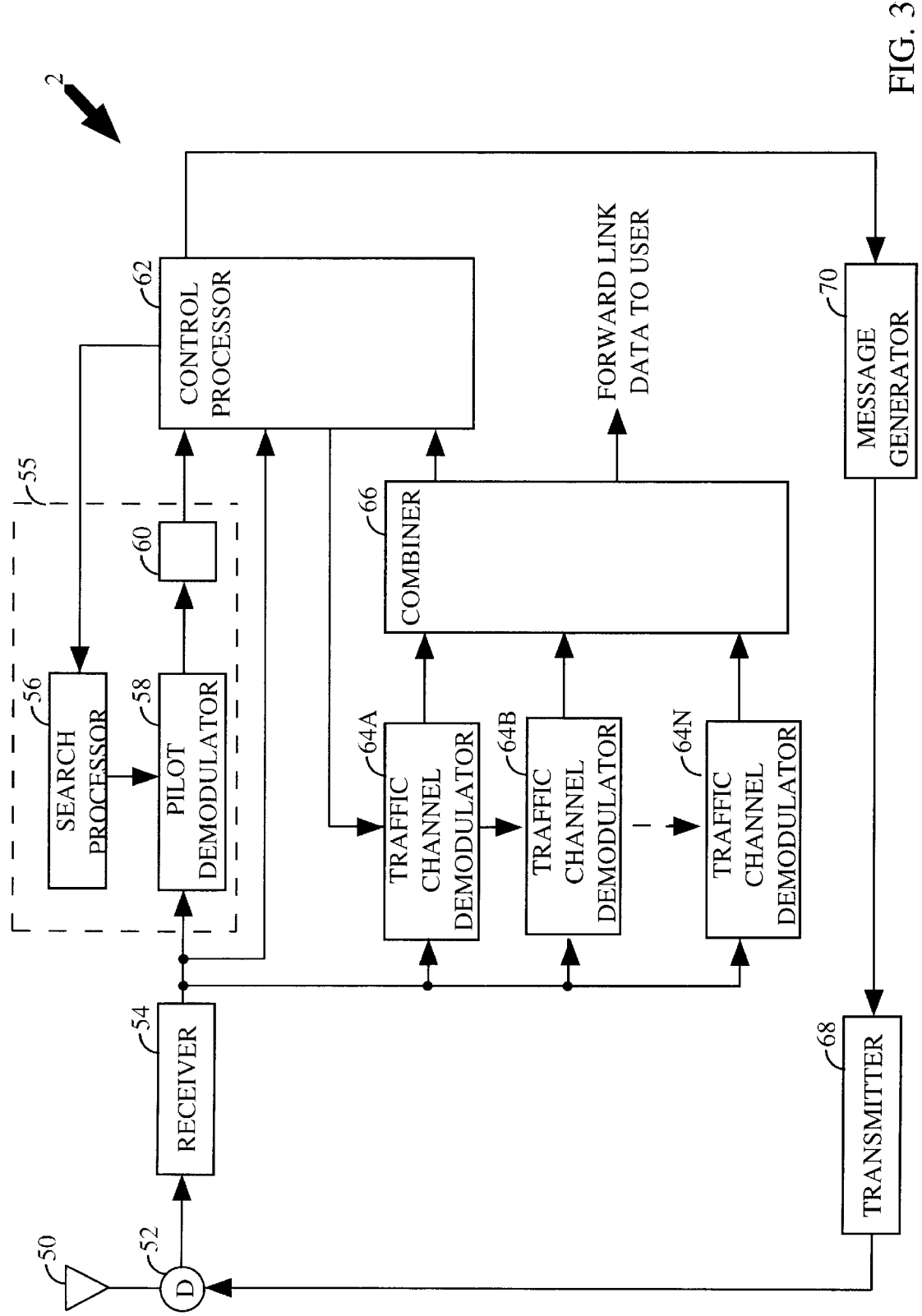
FIG. 3 is a block diagram of the mobile station of the present invention.

FIG. 3 illustrates mobile station 2 of the present invention. Mobile station 2 continuously or at intermittent intervals measures the strength of pilot signals of base stations 4. Signals received by antenna 50 of mobile station 2 are provided through duplexer 52 to receiver (RCVR) 54 which amplifies, down converts, and filters the received signal and provides it to pilot demodulator 58 of searcher subsystem 55.

In addition, the received signal is provided to traffic demodulators 64A–64N. Traffic demodulators 64A–64N, or a subset thereof, separately demodulate signals received by mobile station 2. The demodulated signals from traffic demodulators 64A–64N are provided to combiner 66 which combines the demodulated data, which in turn provides an improved estimate of the transmitted data.

Mobile station 2 measures the strength of pilot signals. Control processor 62 provides acquisition parameters to search processor 56. In the exemplary embodiment of a CDMA communication system, control processor 62 provides a PN offset to search processor 56. Search processor 56 generates a PN sequence which is used by pilot demodulator 58 to demodulate the received signal. The demodulated pilot signal is provided to energy accumulator 60 which measures the energy of the demodulated pilot signal, by accumulating the energy for predetermined lengths of time.

The measured pilot energy values are provided to control processor 62. In the exemplary embodiment, control processor 62 compares the energy values to thresholds $T_{ADD}$ and $T_{DROP}$. $T_{ADD}$ is a threshold value above which the received signal is of sufficient strength to effectively provide communications with mobile station 2. $T_{DROP}$ is a threshold value below which the received signal energy is insufficient to effectively provide communications with mobile station 2.

Mobile station 2 transmits a Pilot Strength Measurement Message which includes all pilot signals with energy greater than $T_{ADD}$ and all members of the current active set whose measured pilot energy have not fallen below $T_{DROP}$ for more than a predetermined time period. In the exemplary embodiment, mobile station 2 generates and transmits a Pilot Strength Measurement Message following the detection of a change in the strength of a pilot under the following three conditions:

1. The strength of a neighbor Set or Remaining Set pilot is found above the threshold $T_{ADD}$.
2. The strength of a Candidate Set pilot exceeds the strength of an Active Set pilot by more that a threshold ($T_{COMP}$).
3. The strength of a pilot in the Active Set has fallen below a threshold ($T_{DROP}$) for greater than a predetermined time period.

In the exemplary embodiment, the Pilot Strength Measurement Message identifies the pilot signal and provides a corresponding measured pilot energy. In the exemplary embodiment, the base stations in the Pilot Strength Measurement Message are identified by their pilot offsets and their corresponding measured pilot energy is provided in units of decibels.

Control processor 62 provides the identities of the pilots and their corresponding measured pilot energies to message generator 70. Message generator 70 generates a Pilot Strength Measurement Message containing the information. The Pilot Strength Measurement Message is provided to transmitter (TMTR) 68, which encodes, modulates, upconverts and amplifies the message. The message is then transmitted through duplexer 52 and antenna 50.

Figure 4:
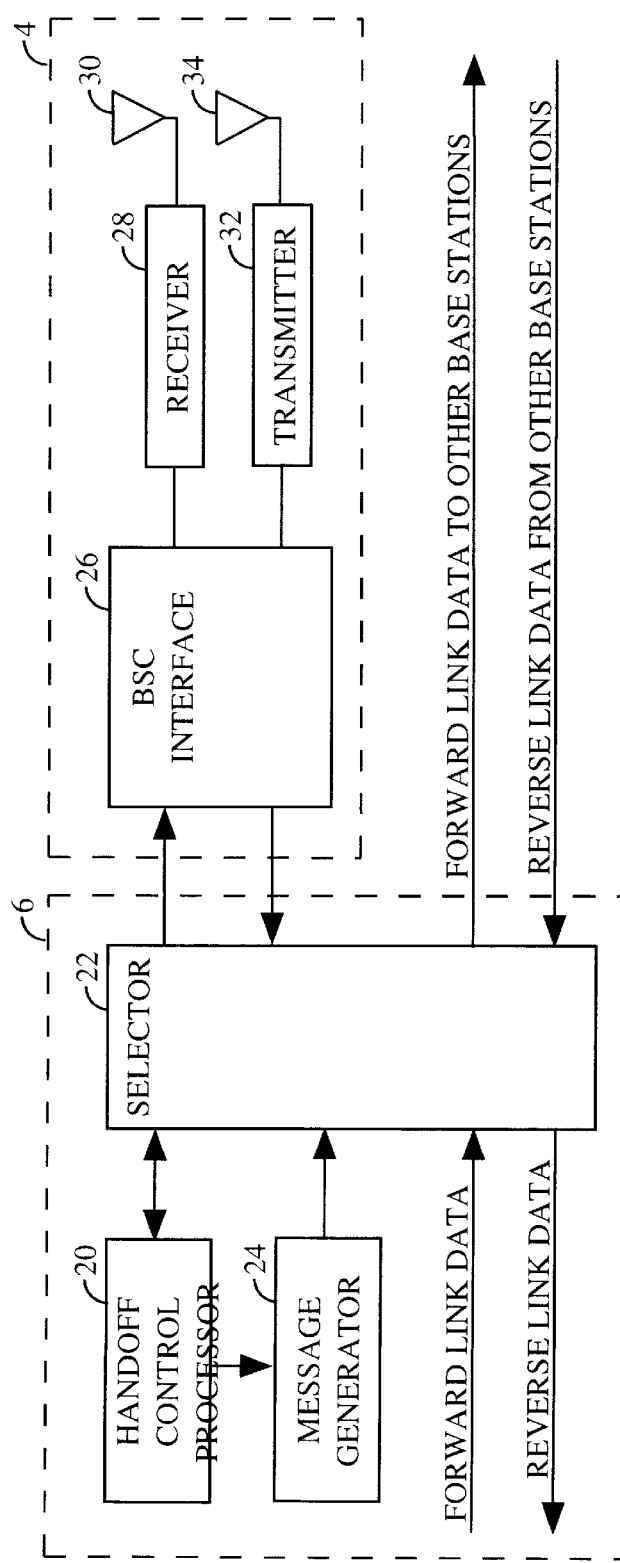
FIG. 4 is a block diagram of the base station of the present invention.

Referring to FIG. 4, the Pilot Strength Measurement Message is received by antenna 30 of base station 4 and provided to receiver (RCVR) 28, which amplifies, down converts, demodulates and decodes the received signal and provides the message to base station controller (BSC) interface 26. Base station controller (BSC) interface 26 sends the message to base station controller (BSC) 6. The message is provided to selector 22, which may also receive the message redundantly from other base stations which are in communication with mobile station 2. Selector 22 combines message estimates received from the base stations in communication with mobile station 2 to provide an improved packet estimates.

Figure 5:
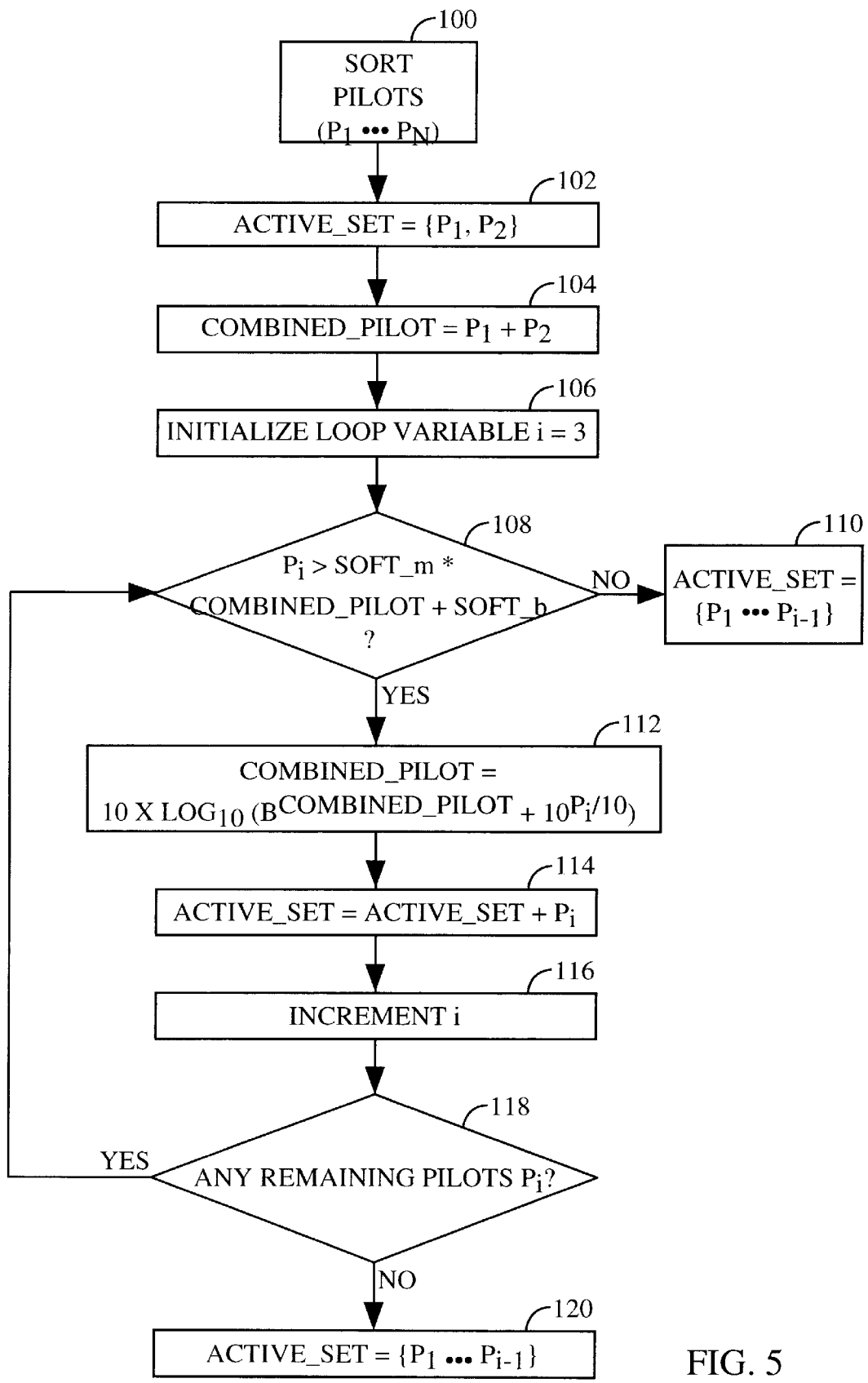
FIG. 5 is a flow diagram of the method for generating the revised active set in the base station controller.

Selector 22 provides the power strength measurement message to hand-off control processor 20. In the first exemplary embodiment, hand-off control processor 20 selects the base stations which will communicate with mobile station 2, that is the members of the revised active set, in accordance with the method provided in FIG. 5.

In block 100, hand-off control processor 20 sorts pilots in the Pilot Strength Measurement Message according to their strengths. So, for example, $P_1$ would be the strongest received pilot, $P_2$ would be the second strongest pilot and so on. In block 102, the revised active set (ACTIVE_SET) is set to include $P_1$ and $P_2$. In block 104, the variable COMBINED_PILOT is set to the sum of the energies of $P_1$ and $P_2$. In block 106, the loop variable i is set to 3.

In block 108, the energy of the pilot signal of the ith strongest received signal ($P_i$) is compared against a threshold value to determine whether it should be added to the revised active set. In the exemplary embodiment, the threshold (T) is determined in accordance with equation (1) below:

$$T = \text{SOFT\_SLOPE} * \text{COMBINED\_PILOT} + \text{SOFT\_INTERCEPT} \quad (1)$$

In the exemplary embodiment, SOFT_SLOPE is set to 2.25 and SOFT_INTERCEPT is set to 3.0. The values of SOFT_SLOPE and SOFT_INTERCEPT can be parameters that are sent over the air to the mobile station or selected values could be programmed into the mobile station. The values of SOFT_SLOPE and SOFT_INTERCEPT can be determined in accordance with factors such as the amount of soft handoff which is acceptable to a network manager and empirical studies on the quality of transmission links. If the energy value $P_i$ is less than the threshold value, then the flow proceeds to block 110 and the revised active set includes the signals corresponding to the pilots $\{P_1 \ldots P_{i-1}\}$.

If the energy value $P_i$ is greater than the threshold value in block 108, then the flow proceeds to block 112. In block 112, a new COMBINED_PILOT is computed by summing the value of the energy of the ith strongest signal in the pilot strength measurement message ($P_i$) with the current value of COMBINED_PILOT. Because in the exemplary embodiment, the energy of the pilot signals is provided in decibels, the energies must be converted to linear representations before being summed and put back into decibel form. In block 114, $P_i$ is added to the revised active set.

In block 116, the loop variable (i) is incremented. In block 118, hand off control processor 20 checks to determine whether all base stations in the pilot strength measurement message have been tested. If there are no remaining pilots to test, then the flow proceeds to block 120 and the revised active set comprises all the base stations in the pilot strength measurement message. If, in block 118, there are base stations in the pilot strength measurement message which remain to be tested, the flow returns to block 108 and proceeds as described above.

After generating the revised active set, base station controller 6 determines whether the base stations in the revised active list can accommodate communications with mobile station 2. If any of the base stations in the revised active set cannot accommodate communications with mobile station 2, they are removed from the revised active set. After generating the revised active set, hand-off control processor 20 provides the information to selector 22 indicating the members in the revised active set. In response to the revised active set provided by hand-off control processor 20, selector 22 allocates traffic channels for performing communications to the mobile station using the base stations in the revised active set.

Hand-off control processor 20 provides a message indicating the revised active set to message generator 24. Message generator 24 generates a message for transmission to mobile station 2, referred to as the handoff direction message. The handoff direction message indicates the base stations in the revised active set and corresponding channels those base stations will use to communicate with mobile station 2. The message is provided through selector 22 and provided to the base stations which were in communication with mobile station 2 prior to the generation of the revised active set. The base stations in communication with mobile station 2 transmit the handoff direction message to mobile station 2.

Referring back to FIG. 3, the handoff direction message is received by antenna 50 of mobile station 2. It is provided to receiver 54, which amplifies, downconverts, demodulates and decodes the message and provides it to control processor 62. Control processor 62 then configures the traffic channel demodulators 64A–64N to demodulate traffic channels in accordance with the revised active set specified in the handoff direction message.

In an alternative embodiment of the present invention, the revised active set is generated at mobile station 2. This alternative embodiment, provides more timely generation of the revised active set. Because the Pilot Strength Measurement Message is only transmitted under the three conditions described above, update of the active set may be undesirably delayed. However, the alternative embodiment results in transmission of the pilot strength measurement message in a more timely fashion.

In the alternative embodiment, mobile station 2 measures received pilot energy as described above. The pilot energy values are provided to control processor 62. In response, control processor 62 generates a revised active set. If the revised active set differs from the current active set, mobile station 2 transmits a message indicating the members of the revised active set to base station controller 6 through base stations 4. Base station controller 6 sets up communications with mobile station 2. Mobile station 2 reconfigures traffic channel demodulators 64A–64N to demodulate received signals in accordance with the mobile generated revised active set.

Figure 6B:
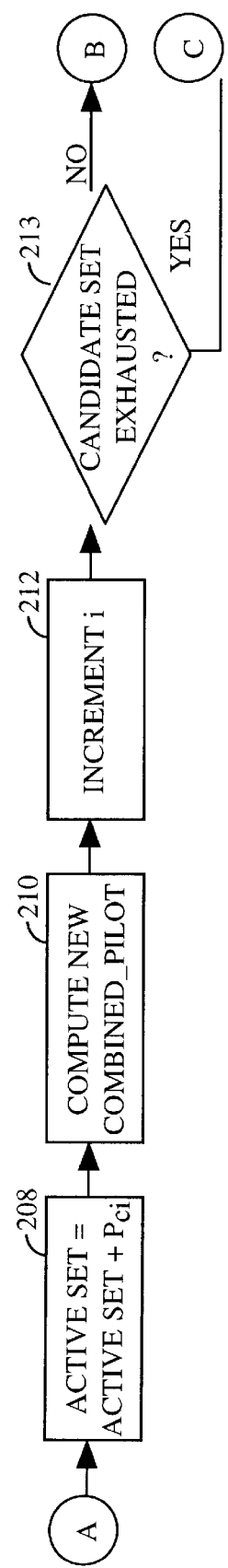
FIG. 6 is a flow diagram of the method for generating the revised active set in the mobile station.
Figure 6A:
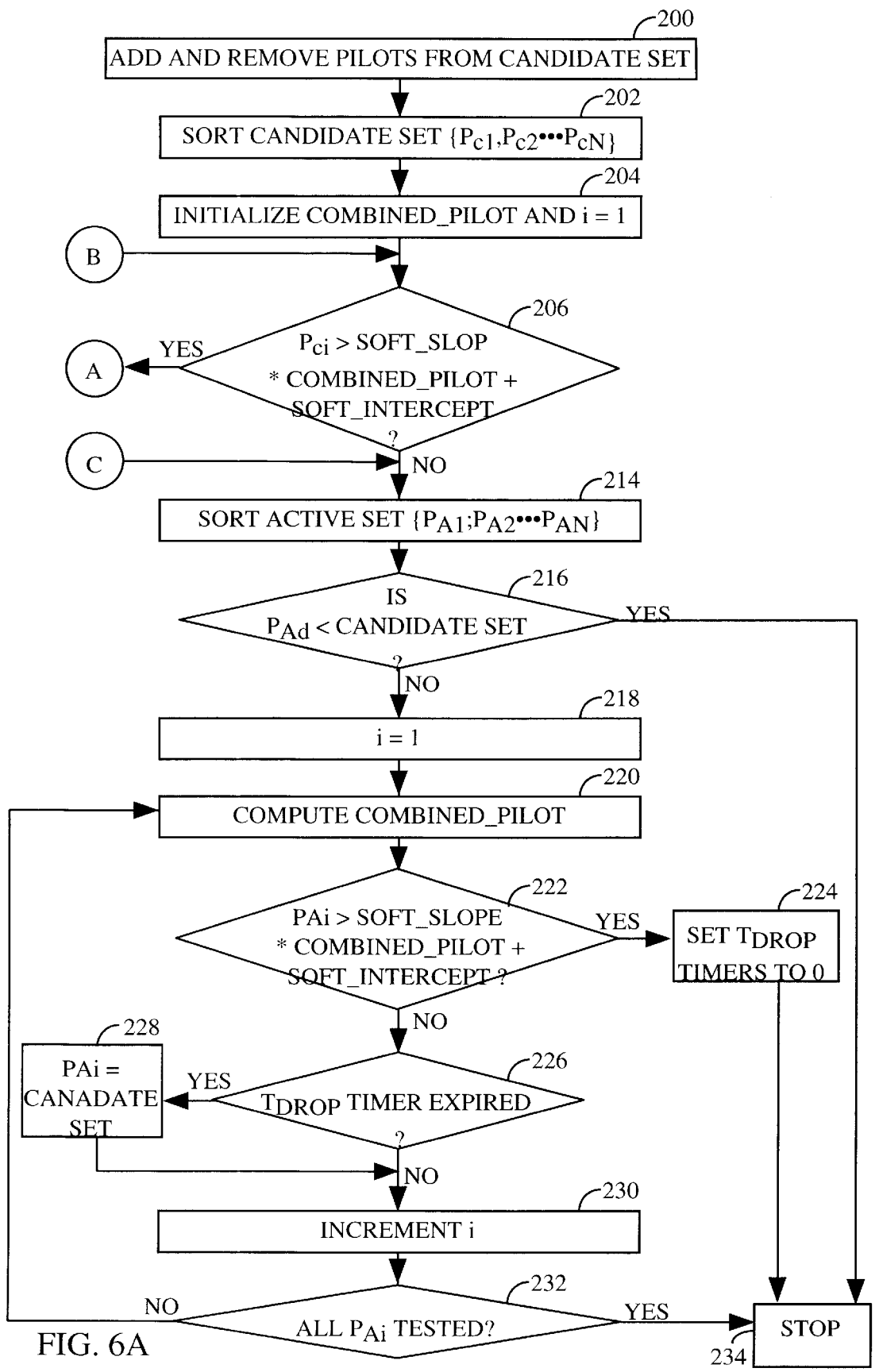

In the exemplary embodiment, control processor 62 in mobile station 2 generates the revised active set in accordance with the method shown in FIG. 6. In block 200, pilots with measured energy in excess of threshold $T_{ADD}$ are added to the candidate set and pilots whose measured energy has fallen below $T_{DROP}$ for more that a predetermined time period are removed from the candidate list. In the exemplary embodiment, the time period during which a pilot is below $T_{DROP}$ is tracked by a timer within control processor 62 referred to herein as the $T_{DROP}$ timer.

In block 202, the pilots in the candidate list are sorted from strongest to weakest. Thus, $P_{C1}$ is stronger than $P_{C2}$, and so on. In block 204, the variable COMBINED_PILOT is set equal to the energy of all pilots in the active set. Also, in block 204, loop variable (i) is initialized to the value 1. In block 206, the candidate set member $P_{Ci}$ is tested to determine whether it should be made part of the revised active set. $P_{Ci}$ is compared against a threshold generated in accordance with the current value of COMBINED_PILOT. In the exemplary embodiment, the threshold (T) is generated in accordance with equation (1) above.

If the pilot energy of $P_{Ci}$ exceeds threshold T, then the flow moves to block 208. In block 208, pilot $P_{Ci}$ is added to the revised active set. In block 210, a new value of COMBINED_PILOT is computed which is equal to the old value of COMBINED_PILOT plus the energy of pilot $P_{Ci}$. In block 212, the loop variable (i) is incremented.

In block 213, it is determined whether all pilots in the candidate set have been tested. If all pilots in the candidate set have not been tested, then the flow moves to block 200 and proceeds as described above. If all pilots in the candidate set have been tested or if, back in block 206, the pilot energy of $P_{Ci}$ did not exceed threshold T, then the flow moves to block 214. In block 214, the revised active set is sorted from lowest energy to highest energy. Thus, $P_{A1}$ has the minimum measured energy in the revised active set, $P_{A2}$ has the second lowest and so on up to the last member of the revised active set $P_{AN}$.

In block 216, it is determined whether $P_{A1}$ is a member of the candidate set. If $P_{A1}$ is a member of the candidate set then the flow moves to block 234 and the revision of the active set is complete. In block 218, loop variable i is set to 1. In block 220, COMBINED PILOT for testing $P_{Ai}$ is computed. The value of COMBINED_PILOT is set equal to the sum of the measured energy of all pilots having energy greater than the pilot currently being tested. Thus, COMBINED_PILOT is determined by the equation:

$$\text{COMBINED\_PILOT} = \sum_{j=i+1}^{N} P_{Aj} \qquad (2)$$

In block 222, the current pilot being tested is compared against a threshold (T) determined in accordance with the computed value of COMBINED_PILOT. In the exemplary embodiment, threshold T is determined in accordance with equation (1) above. If the measured pilot energy $P_{Ai}$ exceeds threshold T, then the flow moves to block 224 and the drop timers for pilots $P_{Ai}$ to $P_{AN}$ are reset to zero and determination of the revised active set ends in block 234.

If the measured pilot energy $P_{Ai}$ does not exceed threshold T, then the flow moves to block 226. In block 226, it is determined whether the $T_{DROP}$ timer for $P_{Ai}$ has expired. If the $T_{DROP}$ timer has expired, then, in block 228, the pilot $P_{Ai}$ is removed from the revised active set and put in the candidate set and the flow proceeds to block 230. If in block 226, it is determined that the $T_{DROP}$ timer for $P_{Ai}$ has not expired, then the flow proceeds directly to block 230. In block 230, the loop variable (i) is incremented. Then, in block 232, it is determined whether all the pilots in the revised active set $P_{Ai}$ have been tested. If all the pilots in the revised active set have been tested, then the flow proceeds to block 234 and generation of the revised active set is complete. If all the pilots in the revised active set have not been tested, then the flow proceeds to block 220 and proceeds as described above.

Figure 7:
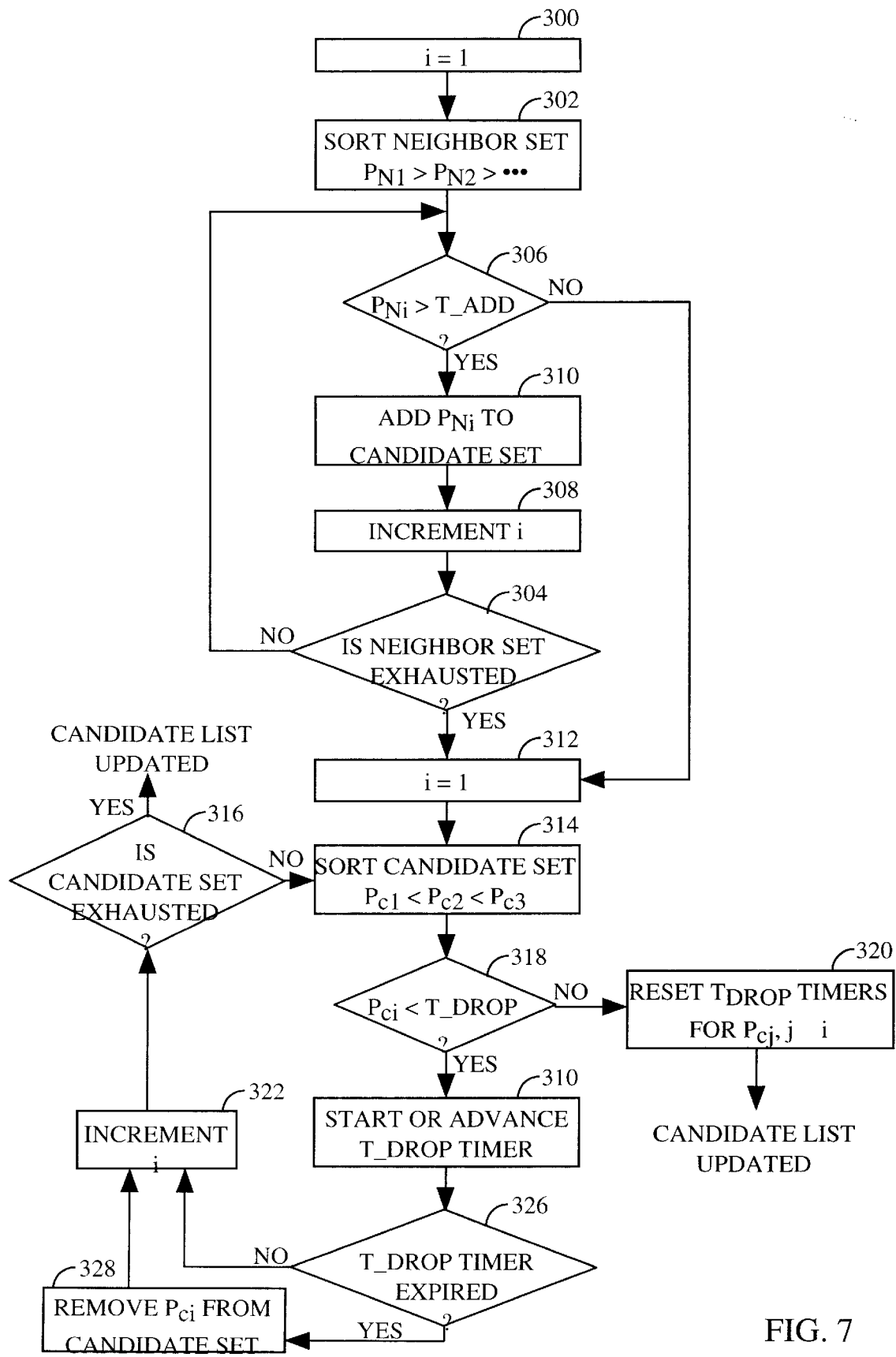
FIG. 7 is flow diagram illustrating the preferred method of generating the candidate set in the mobile station.
Figure 8:
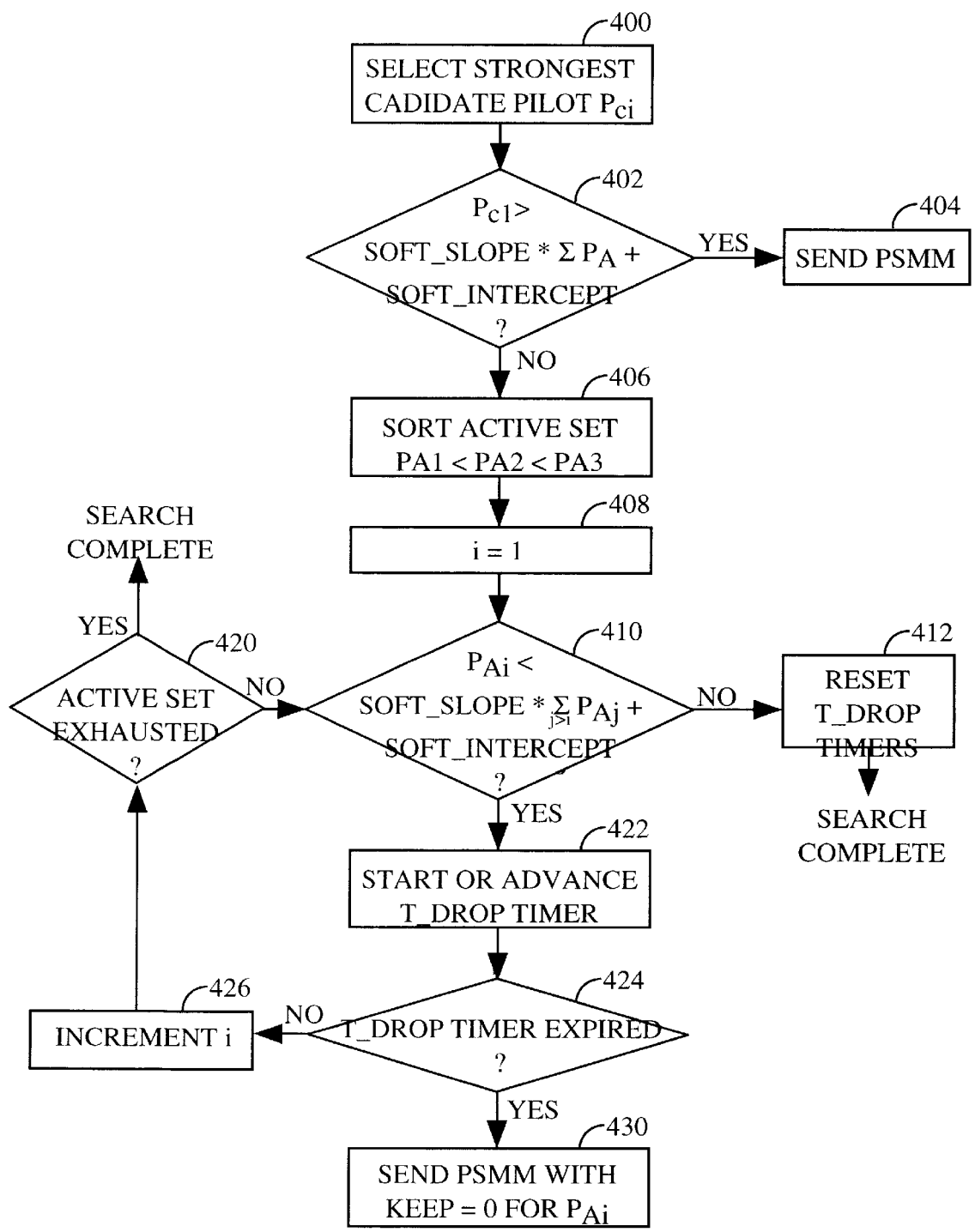
FIG. 8 is a flow diagram illustrating the preferred method of the present invention wherein a change in the preferred members of active set is detected and a pilot strength measurement message is transmitted to the base station in response to the detected changed.

Referring now to FIGS. 7 and 8, a preferred method for implementing the present invention is illustrated. In the preferred embodiment, the mobile station monitors the pilot signals and in response to the monitored pilot signals the mobile station compiles members of the candidate set. Moreover, mobile station determines whether a change to the current active set is desirable in view of the criteria discussed above. Upon detecting any change in the desired membership of the active set, the mobile station generates a pilot strength measurement message that, as described above, includes the identities of all pilots in the candidate and active sets corresponding measured energy values and a corresponding indication whether the pilot should remain in the sets or be dropped into the neighbor set (which is indicated by setting of the KEEP variable described earlier). In the exemplary embodiment, the base station determines the members of the revised active set in accordance with the method described with respect to FIG. 5.

The preferred embodiment provides for timely modification to the members of the active set and provides for determination of the members of the revised active set at the base station, which reduces computations at the mobile station and allows the selection process to include capacity constraints of the base stations. Capacity constraints of the base stations can be taken into account by the base station controller simply by removing or weighting pilot signals which are transmitted by base stations under high capacity load conditions.

FIG. 7 is a flowchart illustrating the method for updating the candidate set, which in the exemplary embodiment is performed within the mobile station. In block 300, the loop variable (i) is initialized to the value 1. In block 302, the pilots of the neighbor set ($P_N$) are sorted such that $P_{N1} > P_{N2} > P_{N3}$, and so on. In block 306, the neighbor set pilot currently being tested ($P_{Ni}$) is compared with the threshold $T_{ADD}$. If the pilot signal energy ($P_{Ni}$) does not exceed the threshold, then, in block 306, the flow proceeds directly to block 312. If the pilot signal energy ($P_{Ni}$) exceeds the threshold then in block 310 the pilot signal is added to the candidate set and the flow proceeds to block 308.

In block 308, the index number of the neighbor set pilot being tested is incremented. Then, in block 304, it is determined whether all members of the neighbor set have been tested. If all members of the neighbor set have not been tested, then the flow moves to block 306 and proceeds as described before. If all members of the neighbor set have been tested, then the flow moves to block 312.

In block 312, the index variable (i) is reset to 1. Then, in block 314, the pilots in the candidate set ($P_C$) are sorted from weakest to strongest, such that $P_{C1} < P_{C2} < P_{C3}$, and so on. In block 318, the energy of the candidate list being tested ($P_{Ci}$) is compared to the drop threshold $T_{DROP}$. If the energy is below the drop threshold, then the flow proceeds to block 310. If the energy is above the drop threshold, then the flow proceeds to block 320. Since the list of pilots is sorted, all the remaining members to be tested are necessarily greater than $T_{DROP}$. So, in block 320, the $T_{DROP}$ timers for $P_{Ci}$ and all pilots stronger than ($P_{Ci}$) are reset and the update of the candidate set is complete.

As described above the $T_{DROP}$ timer is a timer that keeps track of the time that a pilot has been below the drop threshold. The purpose of the $T_{DROP}$ timer is to avoid mistakenly dropping a strong pilot which may have a weak measured energy due to short duration change in the propagation environment, such as a fast fade. In block 310, the $T_{DROP}$ timer is started if the timer for $P_{Ci}$ is not already running or advanced if it is.

In block 326, a test made to determine whether the $T_{DROP}$ timer for the pilot ($P_{Ci}$) has expired. If the timer has expired, then the flow moves to block 328 and the pilot ($P_{Ci}$) is removed from the candidate set. Then the flow moves to block 322. Also, if the timer had not expired in block 326, the flow moves directly to block 322. In block 322, the candidate set index variable (i) is incremented. Then, in block, 316, it is determined whether all pilots in the candidate set have been tested. If all members of the candidate set have been tested the candidate set update is complete. If less than all members of the candidate set have been tested, the flow moves to block 314 and proceeds as described above.

In the preferred embodiment, the selection of the candidate set members is performed in the mobile station. This is because selection of the candidate set, typically, does not require knowledge of capacity constraints of the base stations in the network. However, in an alternative embodiment, the method for dropping candidate set members to the neighbor set may be performed in the base station controller. Moreover, addition of members to the candidate set could be performed in the base station controller provided the base station controller has knowledge of or is provided with knowledge of the members of the mobile station's neighbor set.

FIG. 8 illustrates the method for detecting the need to revise the active set, which in the preferred embodiment is performed in the mobile station. In block 400, the strongest pilot in the candidate set ($P_{C1}'$) is selected. Note the prime is to differentiate the pilot from $P_{C1}$ referred to in FIG. 7 which represented the weakest candidate set pilot. In block 402, the energy of ($P_{C1}$) is compared to a threshold (T) which is based on the cumulative energy of the pilots in the active set, as shown in Equation 3 below.

$$T = f(\Sigma P_{Ai}) = \text{SOFT\_SLOPE} * \Sigma P_{Ai} + \text{SOFT\_ADD\_INTERCEPT} \quad (3)$$

If ($P_{C1}'$) exceeds the threshold (T), then the mobile station transmits the pilot strength measurement message to the base station, in block 404.

If ($P_{C1}'$) does not exceed the threshold (T), then the flow proceeds to block 406. In block 406, the active set is sorted from weakest pilot to strongest pilot. In block 408, the active set index variable (i) is set to 1. Then in block 410, the active set pilot ($P_{ai}$), which is being tested to determine whether it should remain in the active set, is tested against a threshold (T) generated in accordance with a sum of energies of all stronger pilots as shown in equation (4) below:

$$T = f\left(\sum_{j>i} P_{Aj}\right) = \text{SOFT\_SLOPE} * \sum_{j>i} P_{Aj} + \text{SOFT\_DROP\_INTERCEPT} \quad (4)$$

If the pilot being tested ($P_{Ai}$) exceeds the threshold (T), then it and all pilots of strength greater than it should remain in the active set. Thus, in block 412 the $T_{DROP}$ timers for all pilots with strength greater than $P_{Ai}$ are reset and the current search for a revision of the active set is complete, with no need for revision detected by the mobile station. In the preferred embodiment, the intercept value (SOFT_ADD_INTERCEPT) used to generate the add threshold is permitted to be of a value different from the intercept value SOFT_DROP_INTERCEPT used to generate the drop threshold. This provides for greater flexibility and allows the network to introduce additional hysterisis into the signal levels.

If the pilot ($P_{Ai}$) is less than the threshold (T), then the flow proceeds to block 422. In block 422, the $T_{DROP}$ timer for pilot ($P_{Ai}$) is started if not running and advanced if already running. In block 424, whether the $T_{DROP}$ timer for pilot ($P_{Ai}$) has expired is tested. If the $T_{DROP}$ timer has expired, then the mobile station transmits a pilot strength measurement message to the base station in block 430. If the $T_{DROP}$ timer has not expired, then the flow moves to block 426 where the active set pilot index (i) is advanced. Then, the flow moves to block 420, where it is determined whether all active set members have been tested. If all active set members have been tested, then the search ceases with no need to revise the active set detected. If less than all of the members of the active set have been tested, the flow moves to block 410 and proceeds as described previously.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for selecting base stations to communicate with a remote station comprising:

computing a threshold value in accordance with a combination of measurements of signal energies from base stations capable of communicating with said remote station;

comparing a signal energy measurement of a first base station with said threshold value; and selecting said first base station when said signal energy measurement of said first base station exceeds said threshold value;

wherein said combination of signal energy measurements from base stations capable of communicating with said remote station comprises the sum of pilot energy values of pilot with greater received energy than said first base station.

2. The method of claim 1 wherein said step of computing a threshold value comprises performing a linear operation upon said combination of signal energy measurements from base stations capable of communicating with said remote station.

3. In a wireless communications system wherein a first base station transmits a first pilot signal and a first traffic signal, and a second base station transmits a second pilot signal and a second traffic signal, and a remote station receives said first pilot signal and said first traffic signal, a method for determining whether to add a third base station to an Active Set of said remote station, comprising the steps of:

demodulating said first pilot signal;

measuring the energy of said demodulated first pilot signal;

generating a threshold in accordance with said demodulated first pilot signal energy;

demodulating said second pilot signal;

measuring the energy of said demodulated second pilot signal;

comparing said demodulated second pilot signal energy with said threshold;

adding said second base station to said Active Set when said demodulated second pilot signal energy exceeds said threshold;

generating a revised threshold in accordance with a combination of said demodulated first pilot signal energy and said demodulated second pilot signal energy;

demodulating a third pilot signal from said third base station;

measuring the energy of said demodulated third pilot signal;

comparing said demodulated third pilot signal energy with said revised threshold; and adding said third base station to said Active Set when said demodulated third pilot signal energy exceeds said revised threshold.

4. In a wireless communications system in which a plurality of base stations are in communication with a base station controller, a method for determining an Active Set of base stations to communicate with a remote station at said base station controller, comprising the steps of:

receiving a signal strength measurement message indicative of the signal strengths associated with each of said plurality of base stations as measured at said remote station;

selecting a first base station as a member of said Active Set of base stations;

calculating a threshold value in accordance with a signal strength of said selected first base station;

selecting a second base station as a member of said Active Set of base stations in accordance with said threshold value;

summing the signal strengths associated with each of said two selected base stations;

determining a revised threshold value in accordance with said summed signal strengths; and determining remaining members of said Active Set in accordance with said revised threshold value.

5. The method of claim 4 wherein said step of revised determining said threshold value in accordance with said summed signal strengths, comprises the steps of:

multiplying said summed signal strengths by a predetermined scaling value; and adding a predetermine value to said product.

6. A method for determining the base stations to transmit to a remote station at said remote station in which a plurality of base stations comprising an Active Set of base stations transmit to said remote station and wherein a second set of base stations which are not members of said Active Set comprise a Candidate Set of base stations, said method comprising the steps of:

aggregating signal energies of said Active Set of base stations;

generating a threshold value in accordance with said aggregated signal energies of said base station members of said Active Set;

comparing signal energy of a base station of said Candidate Set of base stations with said threshold; and adding said base station of said Candidate Set of base stations to said Active Set of base stations when said signal energy of a base station of said Candidate Set of base stations exceeds said threshold.

7. The method of claim 6 further comprising the steps of:

determining membership of said Candidate Set by comparing the received signal energy from a predetermined set of base stations with a predetermined threshold.

8. The method of claim 6 further comprising the steps of:

sorting members of said Candidate Set in accordance with the corresponding strength of the received signal energy.

9. The method of claim 6 further comprising the steps of:

comparing the received signal strengths of a member of said Active Set against a threshold determined in accordance with the aggregate energy of the received energy of signals from base stations in the Active Set; and removing a member from said Active Set when said received signal strength of said member is less than said threshold.

10. The method of claim 8 wherein said step of removing said member from the Active set is performed at said member has remained below said threshold for a predetermined time interval.

11. The method of claim 8 further comprising the step of transmitting a pilot strength measurement message indicating for each base station in said Candidate Set and said Active Set whether to keep said member in said Active Set.

* * * * *